(12) United States Patent
Shao et al.

(10) Patent No.: US 11,998,962 B2
(45) Date of Patent: Jun. 4, 2024

(54) METHODS FOR SMART GAS PIPELINE CLEANING MANAGEMENT FOR SAFETY MANAGEMENT AND INTERNET OF THINGS SYSTEMS THEREOF

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Bin Liu, Chengdu (CN); Xiaojun Wei, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/149,157

(22) Filed: Jan. 3, 2023

(65) Prior Publication Data
US 2023/0191464 A1    Jun. 22, 2023

(30) Foreign Application Priority Data

Nov. 24, 2022  (CN) .......................... 202211478660.1

(51) Int. Cl.
*B08B 9/055*    (2006.01)

(52) U.S. Cl.
CPC ...... *B08B 9/0551* (2013.01); *B08B 2209/053* (2013.01)

(58) Field of Classification Search
CPC . B08B 13/00; B08B 2209/053; B08B 9/0325; B08B 9/0551; Y02P 90/30
See application file for complete search history.

(56) References Cited

U.S. PATENT DOCUMENTS

2009/0013806 A1    1/2009  Miller et al.

FOREIGN PATENT DOCUMENTS

| CN | 101639158 A | 2/2010 |
|----|-------------|--------|
| CN | 101639159 A | 2/2010 |
| CN | 104565625 A | 4/2015 |
| CN | 105403288 A | 3/2016 |

(Continued)

OTHER PUBLICATIONS

Xiao, Bing, Simulation of Gas Pipeline Clearing Damping and Judgment of Clearing Effect, Master's Thesis, School of Mechanical Engineering, Tongji University, 2008, 127 pages.

(Continued)

*Primary Examiner* — Douglas Lee
(74) *Attorney, Agent, or Firm* — METIS IP LLC

(57) ABSTRACT

The present disclosure provides a method of smart gas pipeline cleaning management for safety management and an Internet of Things system. The method comprises: obtaining operation feature of at least one gas pipeline and inspection data of the at least one gas pipeline; determining an area to be cleaned and an area feature of the area to be cleaned based on the operation feature of the at least one gas pipeline and the inspection data of the at least one gas pipeline; determining a pipeline cleaning solution based on the area feature of the area to be cleaned; evaluating a pipeline cleaning effect of the pipeline cleaning solution based on an implementation of the pipeline cleaning solution. The Internet of Things system comprises a smart gas user platform, a smart gas service platform, a smart gas sensing network platform, and a smart gas object platform.

8 Claims, 6 Drawing Sheets

(56) References Cited

FOREIGN PATENT DOCUMENTS

| | | | |
|---|---|---|---|
| CN | 108266643 | A | 7/2018 |
| CN | 111025901 | A | 4/2020 |
| CN | 113032941 | A | 6/2021 |
| CN | 115456315 | A | 12/2022 |
| JP | 2002005893 | A | 1/2002 |
| JP | 2005052732 | A | 3/2005 |

OTHER PUBLICATIONS

Zhang, Yanbo, Analysis and Research of Oil and Gas Pipeline Cleaning Technology, China Petroleum and Chemical Standard and Quality, 2018, 3 pages.

Zhang, Wenxin et al., Research on Optimal Pigging Scheme of Long-Distance Gas Subsea Pipeline, Petro & Chemical Equipment, 2020, 5 pages.

Qian, Chengwen et al., Risk-Based Analysis for Pipeline Inspection (Rbi) and Evaluation, Oil & Gas Storage and Transportation, 2000, 7 pages.

Ma, Te et al., Analysis on Pigging Technology of Korla-Shanshan Oil Pipeline, Oil & Gas Storage and Transportation, 1999, 10 pages.

Chen, Siding et al., Influencing Factors and Determination Methods of Gas Pipeline Pigging Cycle, Oil & Gas Storage and Transportation, 2013, 6 pages.

First Office Action in Chinese Application No. 202211478660.1 dated Jan. 29, 2023, 19 pages.

Notification to Grant Patent Right for Invention in Chinese Application No. 202211478660.1 dated Feb. 19, 2023, 9 pages.

300 determining cleanliness of each of the at least one gas pipeline based on the operation feature of the at least one gas pipeline and the inspection data of the at least one gas pipeline ~ 310 determining the area to be cleaned based on the gas pipeline whose cleanliness meets a preset cleanliness condition ~ 320 determining the area feature of the area to be cleaned based on the cleanliness of the gas pipeline corresponding to the area to be cleaned ~ 330

FIG. 3

400 determining at least one joint area and a joint area feature of each of the at least one joint area through merging one or more gas pipelines contained in the area to be cleaned based on a preset method ~ 410 determining a target pipeline cleaning solution of the at least one joint area based on the joint area feature of the at least one joint area ~ 420

FIG. 4

METHODS FOR SMART GAS PIPELINE CLEANING MANAGEMENT FOR SAFETY MANAGEMENT AND INTERNET OF THINGS SYSTEMS THEREOF

CROSS-REFERENCE TO RELATED APPLICATIONS

This application claims priority to Chinese Patent Application No. 202211478660.1, filed on Nov. 24, 2022, the contents of which are hereby incorporated by reference to its entirety.

TECHNICAL FIELD

The present disclosure relates to the field of gas pipeline cleaning, and in particular to a method of smart gas pipeline cleaning management for safety management and an Internet of Things system.

BACKGROUND

The gas in gas pipelines usually contains small amounts of carbon dioxide and hydrogen sulfide, and the gas combines with water to form hydrates, which not only leads to blockage of gas transmission pipelines and equipment, affects the efficiency of gas transmission, but also causes a safety hazard for the use of gas pipelines.

Therefore, it is expected to propose a method of smart gas pipeline cleaning management for safety management, which can effectively clean gas pipelines, improve pipeline transmission efficiency, reduce pipeline resistance and extend pipeline service life.

SUMMARY

One or more embodiments of the present disclosure provide a method of smart gas pipeline cleaning management for safety management. The method of smart gas pipeline cleaning management for safety management comprises: obtaining operation feature of at least one gas pipeline and inspection data of the at least one gas pipeline; determining an area to be cleaned and an area feature of the area to be cleaned based on the operation feature of the at least one gas pipeline and the inspection data of the at least one gas pipeline; determining a pipeline cleaning solution based on the area feature of the area to be cleaned; and evaluating a pipeline cleaning effect of the pipeline cleaning solution based on an implementation of the pipeline cleaning solution.

One or more embodiments of the present disclosure provide an Internet of Things system of smart gas pipeline cleaning management for safety management. The Internet of Things system of smart gas pipeline cleaning management for safety management further comprises a smart gas user platform, a smart gas service platform, a smart gas sensing network platform and a smart gas object platform. The smart gas object platform is used to obtain operation feature of at least one gas pipeline and inspection data of the at least one gas pipeline. The smart gas sensing network platform is used to transmit the operation feature of the at least one gas pipeline and the inspection data of the at least one gas pipeline to the smart gas equipment management platform. The smart gas equipment management platform is used to determine an area to be cleaned and an area feature of the area to be cleaned based on the operation feature of the at least one gas pipeline and the inspection data of the at least one gas pipeline; determine a pipeline cleaning solution based on the area feature of the area to be cleaned; and evaluate a pipeline cleaning effect of the pipeline cleaning solution based on an implementation of the pipeline cleaning solution. The smart gas service platform is used to transmit the pipeline cleaning solution and the pipeline cleaning effect to the smart gas user platform.

One or more embodiments of the present disclosure provide a non-transitory computer readable storage medium, the storage medium stores computer instructions, when the computer instructions are executed by a processor, a method of smart gas pipeline cleaning management for safety management is implemented.

BRIEF DESCRIPTION OF THE DRAWINGS

This present disclosure will be further illustrated by way of exemplary embodiments, which will be described in detail by way of the accompanying drawings. These embodiments are not limiting, and in these embodiments the same numbering indicates the same structure, wherein:

FIG. 3 is an exemplary flowchart illustrating the determining the area to be cleaned and the area feature of the area to be cleaned according to some embodiments of the present disclosure;

FIG. 4 is an exemplary flowchart illustrating the determining the pipeline cleaning solution according to some embodiments of this present disclosure;

DETAILED DESCRIPTION

Figure 1:
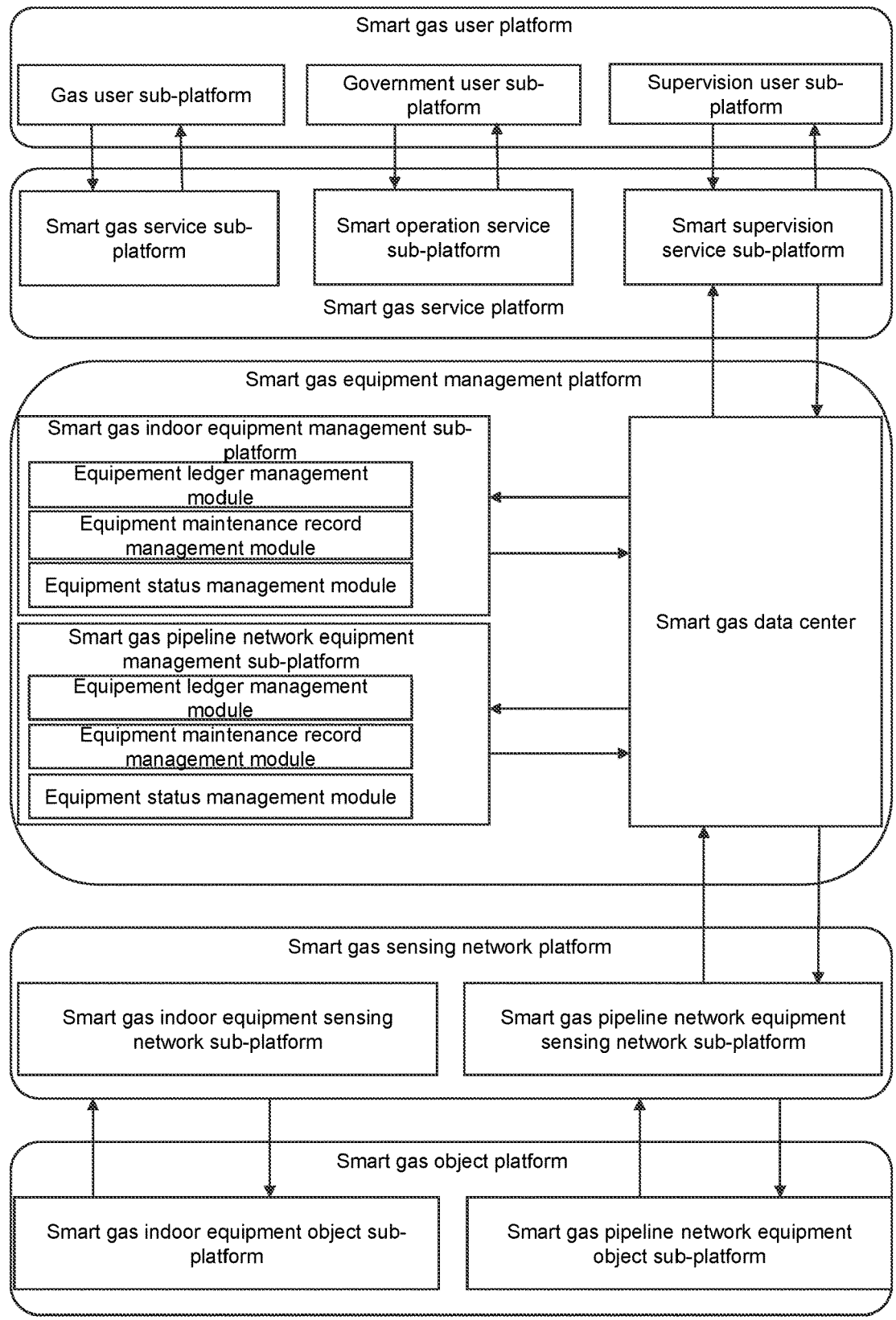
FIG. 1 is an exemplary schematic diagram illustrating an Internet of Things system of smart gas pipeline cleaning management for safety management according to some embodiments of this present disclosure.

In order to more clearly illustrate the technical solutions of the embodiments of this present disclosure, the following is a brief description of the accompanying drawings that need to be used in the description of the embodiments. Obviously, the accompanying drawings below are only some examples or embodiments of this description, and it is possible for ordinary technicians skilled in the art to apply this description to other similar scenarios according to these accompanying drawings without creative effort. Unless obviously obtained from the context or the context illustrates otherwise, the same numeral in the drawings refers to the same structure or operation.

It should be understood that the "system", "device", "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is an exemplary schematic diagram illustrating an Internet of Things system of smart gas pipeline cleaning management for safety management according to some embodiments of this present disclosure. In some embodiments, the Internet of Things system of smart gas pipeline cleaning management for safety management 100 may include a smart gas user platform, a smart gas service platform, a smart gas equipment management platform, a smart gas sensing network platform, and a smart gas object platform.

In some embodiments, the processing of information in the Internet of Things may be divided into a processing process of perceptual information and a processing process of control information. The control information may be information generated based on the perceptual information. The processing of the perceptual information is that the smart gas user platform obtains the perceptual information and pass the perceptual information to the smart gas equipment management platform. The processing of the control information is that the smart gas equipment management platform issues the control information to the smart gas user platform to further realize the corresponding control.

The smart gas user platform is a platform that may be used to interact with users. In some embodiments, the smart gas user platform may be configured as a terminal device, for example, the terminal device may include a mobile device, a tablet computer, etc., or any combination thereof. In some embodiments, the smart gas user platform may be used to feedback the pipeline cleaning solution and the pipeline cleaning effect to the user.

In some embodiments, the smart gas user platform is provided with a gas user sub-platform, a government user sub-platform, and a supervision user sub-platform. The gas user sub-platform is oriented to gas users to provide services related to safe gas consumption. The gas users are users who use gas. In some embodiments, the gas user sub-platform may interact with the smart gas service sub-platform to obtain service warnings related to the safe gas consumption.

The government user sub-platform is oriented to government users to provide data related to gas operation. The government users are users who carry out the gas operation. In some embodiments, the government user sub-platform may interact with the operation service sub-platform to obtain data related to the gas operation.

The supervision user sub-platform is oriented to supervise users to supervise the operation of the entire Internet of Things system of smart gas pipeline cleaning management for safety management. The supervision users are the users of the safety supervision department. In some embodiments, the supervision user sub-platform may interact with the smart supervision service sub-platform to obtain services of safety supervision needs. In some embodiments, the smart gas user platform may interact downward with the smart gas service platform in both directions to receive the pipeline cleaning solution and the pipeline cleaning effect, and issue a pipeline cleaning solution query instruction.

The smart gas service platform may be a platform for receiving and transmitting data and/or information. For example, the smart gas service platform may send the pipeline cleaning solution and the pipeline cleaning effect to the smart gas user platform. In some embodiments, the smart gas service platform is provided with a smart gas service sub-platform, a smart operation service sub-platform, and a smart supervision service sub-platform. The smart gas service sub-platform corresponds to the gas user sub-platform and provides services of safety gas consumption for the gas users. The smart operation service sub-platform corresponds to the government user sub-platform and provides gas operation services for the government users. The smart supervision service sub-platform corresponds to the supervision user sub-platform and provides services of safety supervision for the gas supervision users.

In some embodiments, the smart gas service platform may interact downward in both directions with the smart gas data center in the smart gas pipeline network safety management platform to send the pipeline cleaning solution query instruction to the smart gas data center and receive the pipeline cleaning solution uploaded by the smart gas data center.

The smart gas equipment management platform may refer to a platform that overall plans and coordinates the connection and collaboration between the various functional platforms. The smart gas equipment management platform brings together all the information of the Internet of Things (IoT) and provides the sensing management and control management functions for the IoT operation system. For example, the smart gas equipment management platform may receive the operation feature and inspection data of at least one gas pipeline, and determine the area to be cleaned and the area feature of the area to be cleaned based on the operation feature and the inspection data of the at least one gas pipeline. As another example, the smart gas equipment management platform may determine the pipeline cleaning solution based on the area feature of the area to be cleaned. As another example, the smart gas equipment management platform may evaluate the pipeline cleaning effect of the pipeline cleaning solution based on the implementation of the pipeline cleaning solution.

In some embodiments, the smart gas equipment management platform is provided with a smart gas indoor equipment management sub-platform, a smart gas pipeline network equipment management sub-platform, and a smart gas data center. In some embodiments, the smart gas indoor equipment management sub-platform and the smart gas pipeline network equipment management sub-platform may respectively interact with the smart gas data center in both directions. For example, the smart gas indoor equipment management sub-platform and the smart gas pipeline network equipment management sub-platform may obtain and feed management data from the smart gas data center respectively. In some embodiments, the smart gas data center may aggregate and store all operation data of the IoT system. In some embodiments, the smart gas equipment management platform interacts with the smart gas service platform and the smart gas sensing network platform through the smart gas data center, respectively. For example, the smart gas data center may receive the operation feature and inspection data of the gas pipeline uploaded by the sensing network platform and send the operation feature and inspection data to the smart gas indoor equipment management sub-platform and the smart gas pipeline network equipment management sub-platform for processing, and then send the aggregated and processed data to the smart gas service platform and/or the smart gas sensing network platform.

In some embodiments, the smart gas pipeline network equipment management sub-platform is provided with an equipment ledger management module, an equipment maintenance record management module, and an equipment status management module. The equipment ledger management module may be used to realize diverse classification management of equipment such as categories and regions, and extract basic information (such as equipment model, specification, quantity, location, etc.) and operation information (such as installation time, operation time, etc.) from the smart gas data center. The equipment maintenance record management module may be used to extract equipment maintenance records, repair records, and inspection record data from the smart gas data center, and may realize equipment firmware upgrade management. The equipment status management module may be used to view the current operation status, expected service life, etc. of the equipment.

The smart gas sensing network platform may be a functional platform for the management of sensing communication. The smart gas sensing network platform may be configured as a communication network and gateway for network management, protocol management, command management, and data parsing. In some embodiments, the smart gas sensing network platform may connect to the smart gas equipment management platform and the smart gas object platform to achieve the functions of sensing communication of perceptual information and sensing communication of control information. For example, the smart gas sensing network platform may receive the operation feature and inspection data of the gas pipeline uploaded by the smart gas object platform and send an instruction for obtaining data related to the gas equipment to the smart gas object platform.

The smart gas object platform may be a functional platform for generating the perceptual information. In some embodiments, the smart gas object platform is provided with a smart gas indoor equipment object sub-platform and a smart gas pipeline network equipment object sub-platform. The smart gas pipeline network equipment object sub-platform may include a flow meter, thermometer, barometer, etc. The flow meter may be used to obtain the actual transportation flow of the gas pipeline. The thermometer is used to obtain the actual transportation temperature of the gas pipeline. The barometer is used to obtain the actual transportation air pressure of the gas pipeline. In some embodiments, the smart gas pipeline network equipment object sub-platform may also include pipeline cleaning equipment. The pipeline cleaning equipment is used to clean gas pipelines, etc. The smart gas indoor equipment object sub-platform may include indoor equipment. The data related to the indoor equipment is uploaded to the smart gas data center through the indoor equipment sensing network sub-platform.

It should be noted that the smart gas user platform in this embodiment may be a desktop computer, tablet computer, laptop computer, cell phone or other electronic device capable of data processing and data communication, which is not limited here. It should be understood that the data processing referred to in this embodiment may be processed by the processor of the server, and the data stored on the server may all be stored on a storage device of the server, such as a storage such as a hard disk. In specific applications, the smart gas sensing network platform may use multiple groups of gateway servers, or multiple groups of smart routers, which is not limited here. It should be understood that the data processing mentioned in this embodiment may be processed by the processor of the gateway server, and the data stored in the gateway server may all be stored on the storage of the gateway server, such as hard disk and SSD and other storage.

In some embodiments of this disclosure, the Internet of Things (IoT) functional architecture of the five platforms is used to implement the gas pipeline cleaning management of the smart gas, which completes the closed loop of the information process and makes the IoT information processing smoother and more efficient.

It should be noted that the above description of the system and its components is for descriptive convenience only and does not limit the present disclosure to the scope of the embodiments cited. It should be understood that it is possible for a person skilled in the art, with an understanding of the principle of the system, to make any combination of the components or to form subsystems to connect to other components without departing from this principle. For example, the smart gas equipment management platform and the smart gas sensing network platform may be integrated in one component. As another example, the component parts may share a common storage, or each component may have its own storage. Such variants are within the scope of protection of this present disclosure.

Figure 2:
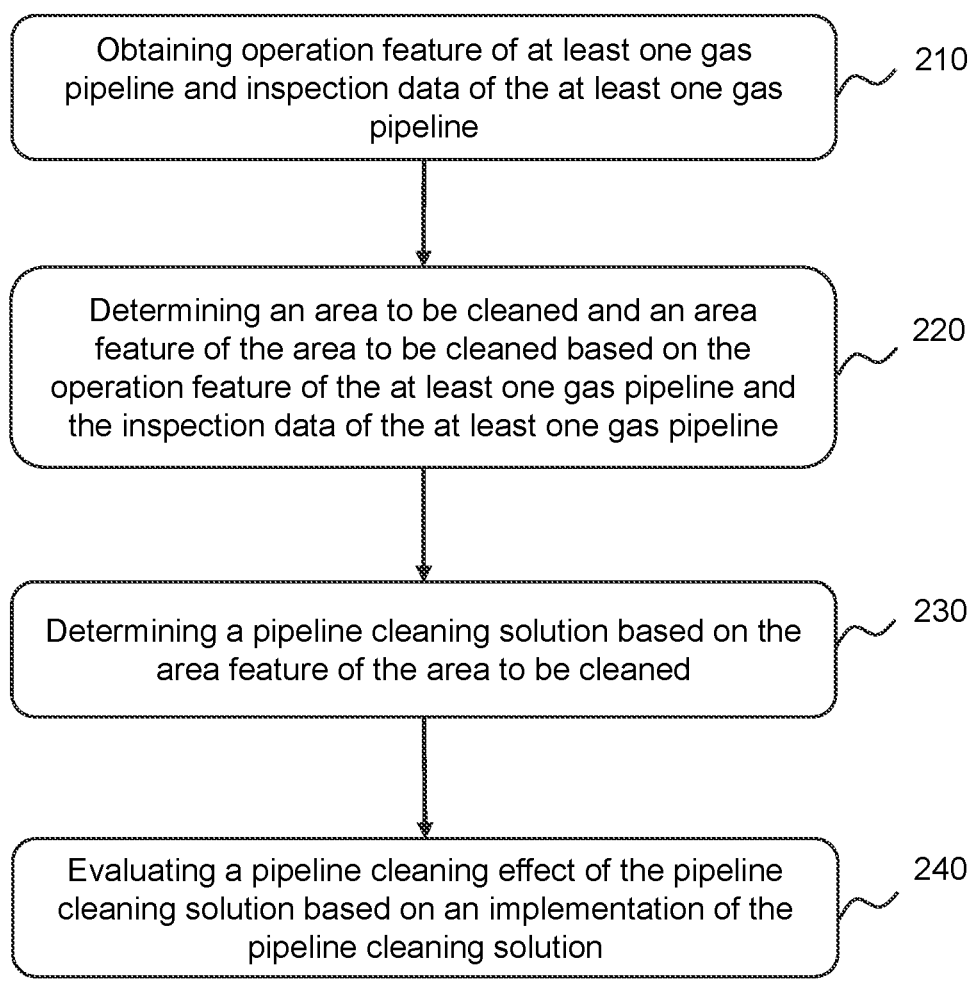
FIG. 2 is an exemplary flowchart illustrating a method of smart gas pipeline cleaning management for safety management according to some embodiments of this present disclosure.

FIG. 2 is an exemplary flowchart illustrating a method of smart gas pipeline cleaning management for safety management according to some embodiments of this present disclosure. As shown in FIG. 2, the process 200 includes the following steps. In some embodiments, the process 200 may be performed by the smart gas equipment management platform.

Step 210, obtaining operation feature of at least one gas pipeline and inspection data of the at least one gas pipeline.

The gas pipeline is the pipeline used for gas transmission. One gas pipeline may include multiple gas pipeline segments. The gas pipeline may include various types, for example, Polyvinyl chloride (PVC) synthetic pipeline, aluminum-plastic composite pipeline, etc. The gas pipeline segment is the main component used to make up the gas pipeline. The multiple gas pipeline segments are interconnected to form a gas pipeline for transporting gas to a designated location.

The operation feature are the parameters associated with the operation of the gas pipeline. The operation feature may contain a variety of data, for example, the operation feature may include the transported gas composition, the gas transportation rate, the gas transportation pressure (e.g., pressure in the gas pipeline), etc. In some embodiments, the operation feature may be fixed rated parameters, such as preset parameters according to transmission needs.

In some embodiments, the operation feature may be represented by a vector. For example, the operation feature may be constructed as a vector $m=(a, b, c, \ldots )$, each element of which represents a parameter related to the operation of the gas pipeline, for example, a represents the gas composition, b represents the gas transportation rate, c represents the pressure inside the gas pipeline, etc.

In some embodiments, the smart gas equipment management platform may obtain at least one operation feature of the gas pipeline in a variety of ways. For example, the smart gas equipment management platform may obtain the preset parameters of gas equipment during operation as the operation feature of the gas pipeline. Exemplarily, the smart gas equipment management platform may obtain the preset parameters of each gas equipment uploaded by a user (e.g., an operator) as the operation feature of the gas pipeline. As another example, the smart gas equipment management platform may obtain the operation feature of gas pipeline based on historical data. Exemplarily, the smart gas equipment management platform may obtain the historical operation parameters of each gas equipment as the operation feature of that gas pipeline.

The inspection data is the data obtained by inspecting and monitoring the gas pipeline, for example, the image inside the pipeline taken by the inspection robot during the inspection, the pressure inside the gas pipeline obtained by the pressure sensor, the temperature inside the gas pipeline obtained by the temperature sensor, and the gas flow rate inside the pipeline measured by the flow rate meter. In some embodiments, the inspection data may be data obtained by real-time monitoring.

In some embodiments, the smart gas equipment management platform may obtain inspection data of the gas pipeline in a variety of ways. For example, the smart gas equipment management platform may obtain inspection data monitored in real time by the smart gas object platform through the smart gas sensing network platform. The smart gas object platform may include an inspection robot, pressure sensor, temperature sensor, flow rate meter, etc. As another example, the smart gas object platform may upload the real-time monitored inspection data to the smart gas equipment management platform through the smart gas sensor network platform.

In some embodiments, the smart gas equipment management platform may also obtain data from the user side or the use side.

The user side is the software or hardware used by the user, for example, a device such as a cell phone, tablet, computer or a gas-related service client used by the user. The user is the user who actually uses the gas, such as the user corresponding to the gas user sub-platform. The user-side data is the data obtained through the user side, for example, data such as gas combustion temperature, gas flame size, and gas flame color uploaded by the user to the user side.

The use side is the equipment hardware corresponding to the equipment that directly uses gas, such as a smart gas meter. The use side may display gas-related parameters, such as the gas consumption, etc.

In some embodiments, the smart gas equipment management platform may obtain user-side or use-side data in a variety of ways. For example, the smart gas equipment management platform may obtain the user-side data uploaded by users through the smart gas service platform based on the smart gas user platform. As another example, the smart gas equipment management platform may obtain data from the use side through the smart gas sensing network platform based on the smart gas object platform.

In some embodiments of this present disclosure, the data from the user side or the use side may be combined to fully consider the gas consumption, which may ensure that the area to be cleaned determined in the subsequent steps is an indeed area where the pipeline cleaning is urgently needed and also make the area feature of the area to be cleaned more accurate and finer, thus further making the pipeline cleaning solution more reasonable and efficient.

Step 220, determining an area to be cleaned and an area feature of the area to be cleaned based on the operation feature and the inspection data of the at least one gas pipeline.

The area to be cleaned is the pipeline that needs to be cleaned. For example, a gas pipeline in a street needs to be cleaned, the gas pipeline in the street may be the area to be cleaned. In some embodiments, the area to be cleaned may include one or more gas pipelines. For example, the area to be cleaned may be the main gas pipeline of a residential block, or all the gas pipelines in the residential block, or the gas pipelines of a building in the residential block.

The area feature is the data that characterize the gas pipeline in the area to be cleaned. For example, the area feature may be the in-pipeline image of one or more pipelines in the area to be cleaned, data (temperature, rate, pressure, etc.) collected in real time at various points, etc. In some embodiments, the area feature may include the cleanliness of the area to be cleaned.

In some embodiments, the smart gas equipment management platform may determine the area to be cleaned based on a preset rule. For example, the preset rule may be that gas pipelines with the difference between certain parameters in the operation feature and/or inspection data and their standard values or standard ranges exceeds a corresponding difference threshold (e.g., 5%, 8%, etc.) is taken as the area to be cleaned.

In some embodiments, the smart gas equipment management platform may determine the cleanliness of the area to be cleaned based on preset arithmetic rule and determine the cleanliness as an area feature of the area to be cleaned. For example, the preset arithmetic rule may be to classify cleanliness levels based on the difference between certain parameters in the operation feature and/or inspection data and their standard values or standard ranges. By way of example only, a cleanliness level of "A" is assigned to a difference less than 3%, a cleanliness level of "B" is assigned to a difference within a range of 3%-5%, and a cleanliness level of "C" is assigned to a difference more than 5%. The criteria and way of setting the cleanliness level may also be other, which is not limited here. For more information about the area to be cleaned and the determination of the area features of the area to be cleaned, please refer to FIG. 3 and its related description.

Step 230, determining a pipeline cleaning solution based on the area feature of the area to be cleaned.

The pipeline cleaning solution is the solution for cleaning the pipeline in the area to be cleaned. In some embodiments, the pipeline cleaning solution may include the selection of the pipeline cleaning equipment, the parameters of the pipeline cleaning equipment, the cleaning time, the pipeline cleaning operation time, the pipeline gas delivery pressure adjustment, etc.

In some embodiments, the selection of the pipeline cleaning equipment refers to the selection of the equipment used to perform the specific pipeline cleaning, for example, a leather bowl cleaner, a pipeline cleaning ball, etc. The parameters of the pipeline cleaning equipment may include the size, type, and overfilling of the pipeline cleaning equipment. The cleaning time is the specific moment when the pipeline cleaning task is performed. The smart gas equipment management platform may stop gas delivery of the affected gas pipeline in a timely manner based on the cleaning time. The pipeline cleaning operation time is the time from the beginning to the end of the pipeline cleaning task.

In some embodiments, the smart gas equipment management platform may select a pipeline cleaning solution from preset candidate pipeline cleaning solutions based on the area feature of the area to be cleaned.

For example, the pipeline cleaning solution corresponding to each type of area feature may be preset, then after determining the area feature of the area to be cleaned, the pipeline cleaning solution may be determined from the corresponding candidate pipeline cleaning solutions. For more information about the determination of the pipeline cleaning solution, please refer to FIG. 4 and its related description.

Step 240, evaluating pipeline cleaning effect of the pipeline cleaning solution based on the implementation of the pipeline cleaning solution.

In some embodiments, the smart gas equipment management platform may perform a pipeline cleaning solution in a variety of ways. For example, the smart gas equipment management platform may send the pipeline cleaning solution to the government user sub-platform in the smart gas user platform through the smart operation service sub-platform of the smart gas service platform, and display the pipeline cleaning solution to the corresponding management personnel. Managers and/or units arrange manual and/or pipeline cleaning equipment to clean gas pipelines in accordance with the pipeline cleaning solution. As another example, the smart gas equipment management platform may also send the pipeline cleaning solution directly to the smart gas pipeline network equipment object sub-platform through the smart gas sensing network platform and issue the pipeline cleaning instruction for the pipeline cleaning equipment in the smart gas pipeline network equipment object sub-platform, and the pipeline cleaning equipment may clean the gas pipeline.

The pipeline cleaning effect refers to the effect resulting from the implementation of the pipeline cleaning solution. For example, the pipeline cleaning effect may be the cleanliness of the pipeline after the implementation of the pipeline cleaning solution, the gas pipeline transmission efficiency within 24 hours after the gas flow state is stable, etc.

In some embodiments, the smart gas equipment management platform may evaluate the pipeline cleaning effect of the pipeline cleaning solution in a variety of ways. For example, the smart gas equipment management platform may re-obtain the operation feature and inspection data within 24 hours after the gas flow state is stable after the pipeline cleaning solution is implemented, and determine the cleanliness of the gas pipeline after cleaning based on the obtained operation feature and inspection data, and use the cleanliness of the gas pipeline after cleaning as the pipeline cleaning effect. As another example, the smart gas equipment management platform may obtain the gas pipeline transmission efficiency within 24 hours after the gas flow state is stable through the smart gas object platform, and use the gas pipeline transmission efficiency as the pipeline cleaning effect. For other ways of evaluating the pipeline cleaning effect, please refer to FIG. 5 and its related description.

In some embodiments of this present disclosure, the area to be cleaned and the area feature of the area to be cleaned are determined based on operation feature and inspection data, and then the pipeline cleaning solution may be determined based on the area to be cleaned and the area feature of the area to be cleaned, so that gas pipes in urgent need of cleaning may be found in a timely manner and cleaned in a reasonable and effective manner. By evaluating the pipeline cleaning effect of the pipeline cleaning solution, the pipeline cleaning solution with best pipeline cleaning effect may be selected to ensure the actual cleaning effect of the gas pipeline, which in turn ensures the safety of the gas pipeline operation and the efficiency of the gas transmission.

FIG. 3 is an exemplary flowchart illustrating the determining the area to be cleaned and the area feature of the area to be cleaned according to some embodiments of the present disclosure. As shown in FIG. 3, the process 300 includes the following steps. In some embodiments, the process 300 may be performed by the smart gas equipment management platform.

Step 310, determining cleanliness of each of the at least one gas pipeline based on the operation feature and the inspection data of the at least one gas pipeline.

The cleanliness may refer to the degree of cleanliness of the gas pipeline. The cleanliness may be expressed in various ways. For example, it may be expressed as a numerical value. Exemplarily, the cleanliness may be expressed by specific numbers (such as 70, 80, etc.) or levels (such as 1-5), etc. The larger the number or the lower the level is, the better the cleanliness is. As another example, the cleanliness may also be expressed by texts (such as excellent, flat and poor).

The smart gas equipment management platform may determine the cleanliness of each gas pipeline of at least one gas pipeline by various feasible means based on the operation feature and inspection data of at least one gas pipeline. In some embodiments, the smart gas equipment management platform may determine the cleanliness of the gas pipeline based on the preset rule. For example, a comparison relationship between a change degree of a certain operation feature and/or the inspection data of the gas pipeline relative to its standard value or standard range and the cleanliness may be preset, and the cleanliness of the gas pipeline may be determined based on the comparison relationship. Exemplarily, it may be preset that when the operation feature and/or inspection data of the methane content in the gas pipeline decrease by 5% relative to its standard value or standard range, the corresponding gas pipeline cleanliness is 80.

In some embodiments, the smart gas equipment management platform may also determine the cleanliness of the gas pipeline through processing operation feature and inspection data of each gas pipeline of the at least one gas pipeline based on the cleanliness determination model. The cleanliness determination model is a machine learning model.

The cleanliness determination model is used to determine the cleanliness of the gas pipeline. The cleanliness determination model may include any one or a combination of various feasible models such as a recurrent neural network model, a deep neural network model, a convolutional neural network model, etc.

The input of the cleanliness determination model may include the operation feature and inspection data of each gas pipeline of the at least one gas pipeline, and the output of the cleanliness prediction model may include the cleanliness of the gas pipeline.

In some embodiments, the cleanliness determination model may be obtained by model training. The smart gas equipment management platform may train the cleanliness determination model based on a first training sample with labels. Specifically, the first training sample with labels may be input into the cleanliness determination model, and the parameters of the cleanliness determination model are updated by training. The first training sample may include historical operation feature of the gas pipeline as well as historical inspection data. The historical operation feature may be derived from the operational parameters of the gas pipeline during the historical time period (e.g., six months, three months, etc.) or the historical preset parameters uploaded by the user, and the historical inspection data may be derived from the inspection data of the gas pipeline during the historical time period (e.g., six months, three months, etc.). The label of first training sample is the corresponding cleanliness of the gas pipeline. In some embodiments, the label may be obtained based on historical data. For example, the labels may be derived from the historical cleanliness of the gas pipeline during the corresponding historical time period. In some embodiments, the label may be obtained by means of manual labeling.

In the training process, the smart gas equipment management platform may train the cleanliness determination model in various feasible ways. For example, a loss function may be constructed based on the output of the initial cleanliness determination model and the label, and the parameters of the cleanliness determination model may be iteratively updated based on the loss function through gradient descent or other methods. The model training is completed when the preset condition is met, and the trained cleanliness determination model is obtained. The preset condition may be that the loss function converges, the number of iterations reaches a threshold, etc.

In some embodiments of this disclosure, the determination of the cleanliness of a gas pipeline based on a cleanliness determination model can improve the accuracy of the cleanliness determination while increasing efficiency and reducing errors in manual judgment.

Step 320, determining the area to be cleaned based on the gas pipeline whose cleanliness meets a preset cleanliness condition.

The preset cleanliness condition may refer to a preset condition used to determine whether a gas pipeline needs to be cleaned. The gas pipeline that meets the preset cleanliness condition needs to be cleaned. For example, the preset cleanliness condition may be that the cleanliness is less than a preset value or the level of cleanliness is greater than a preset level. Exemplarily, if the preset value of the cleanliness is 80 and the cleanliness of the gas pipeline A is 75, it may be determined that the gas pipeline A meets the preset cleanliness condition, i.e., the gas pipeline A needs to be cleaned. As another example, if the cleanliness is divided into levels 1-5 from high to low, the preset level of cleanliness is 3, and the cleanliness level of gas pipeline B is 2, it may be determined that gas pipeline B does not meet the preset cleanliness condition, i.e., gas pipeline B does not need to be cleaned.

In some embodiments, the preset cleanliness condition may be determined by the user. For example, the user may input the preset cleanliness condition through the terminal. In some embodiments, the preset cleanliness condition may also be obtained based on historical data. For example, the historical cleanliness condition may be used as a preset cleanliness condition.

The area to be cleaned may refer to the gas pipeline to be cleaned or the area where the gas pipeline to be cleaned is located. For more information about the area to be cleaned, please refer to FIG. 2 and its related description.

In some embodiments, the smart gas equipment management platform may determine the area to be cleaned in a variety of ways. For example, the smart gas equipment management platform may directly determine the area where a gas pipeline whose cleanliness meets a preset cleanliness condition is located as the area to be cleaned. Exemplarily, for a plurality of gas pipelines A, B, C and D, the cleanliness of gas pipelines A and B meet a preset cleanliness condition, it may be determined that gas pipelines A and B are the areas to be cleaned. As another example, the smart gas equipment management platform may also determine gas pipelines that have a direct connection to the gas pipeline as the area to be cleaned as the area to be cleaned based on the gas pipeline whose cleanliness meets a preset cleanliness condition. For example, in the above example, the gas pipeline C directly connected to the gas pipeline A may also be determined as the area to be cleaned.

Step 330, determining the area feature of the area to be cleaned based on the cleanliness of the gas pipeline corresponding to the area to be cleaned.

The area feature is the relevant feature of the area to be cleaned. The area feature may include features s such as the location of the area to be cleaned, the gas pipeline number, the length of the gas pipeline, and the cleanliness of the gas pipeline, etc. In some embodiments, the area feature may be represented by a feature vector. For example, an area feature vector may be constructed as m==(a, b, c, . . . ), each element of which represents an area feature. Exemplarily, (residential block A, No. 001, 120 meters, 80) may indicate that the area to be cleaned is the area where gas pipeline 001 is located, the area to be cleaned is located in District A, the length of the gas pipeline in the area to be cleaned is 120 meters, and the cleanliness is 80. For more information about the area feature, please refer to FIG. 2 and its related description.

In some embodiments, the smart gas equipment management platform may obtain the area feature of the area to be cleaned in a variety of ways. For example, the area feature of the area to be cleaned may be obtained based on a trained feature extraction model. Exemplarily, the area to be cleaned may be input to the feature extraction model to obtain the output area feature of the area to be cleaned. As another example, the area feature of the area to be cleaned may be determined by manual inputting. Exemplarily, the user may input feature information such as the location of the area to be cleaned, the length of the gas pipeline, the cleanliness of the gas pipeline, etc. at the terminal.

In some embodiments, the area feature also includes the latest cleaning time of the gas pipeline.

The latest cleaning time may refer to the latest time to clean the gas pipeline. The latest cleaning time may be a certain day (e.g., 5 days later, September 23, etc.) or a specific time period (e.g., morning, 13:00-15:00, etc.).

In some embodiments, the smart gas equipment management platform may determine the latest cleaning time of the gas pipeline in a variety of ways. For example, the latest cleaning time of the gas pipeline may be obtained by manual inputting. Specifically, for example, the user may input the latest cleaning time according to the usage needs of the gas pipeline. As another example, the latest cleaning time of a gas pipeline may also be obtained based on historical data. For example, the latest cleaning time corresponding to cleanliness of the current gas pipeline may be determined based on a comparison relationship between the historical cleanliness and the historical latest cleaning time.

In some embodiments, the latest cleaning time of the gas pipeline may also be determined based on processing the cleanliness sequence of the gas pipeline by the cleanliness prediction model.

The cleanliness sequence may refer to a sequence composed of cleanliness corresponding to multiple historical time points. The cleanliness sequence may be expressed as X=(x1, x2, x3, . . . , xn), each element of which may represent the cleanliness corresponding to a historical time point. For example, a cleanliness sequence X=(x1, x2, x3, ..., x10) may be constructed based on the cleanliness corresponding to 10 a.m. every day for the past 10 days, each element of which represents the cleanliness of the gas pipeline at 10 a.m. every day for the past 10 days.

The cleanliness prediction model is used to predict the latest cleaning time of the gas pipeline. The cleanliness prediction model may be a trained machine learning model, for example, a recurrent neural network model, etc.

An input of the cleanliness prediction model may include a cleanliness sequence of the gas pipeline and an output of the cleanliness prediction model may include the latest cleaning time of the gas pipeline.

In some embodiments, the cleanliness prediction model may be obtained by model training. The smart gas equipment management platform may input a second training sample with labels into the cleanliness prediction model and update the parameters of the cleanliness prediction model through training. The second training sample may include a historical cleanliness sequence of the gas pipeline. In some embodiments, the second training sample may be derived from the historical output of the cleanliness determination model. For more detailed information about the cleanliness determination model, please refer to the relevant description of step 310. The labels of the second training sample are the latest cleaning time of the gas pipeline. In some embodiments, the label may be obtained based on historical actual cleaning situation. For example, if the operation feature and the inspection data of a gas pipeline are collected on a certain day in history, and the gas pipeline produces a fault due to untimely cleaning after 7 days of the collection, the latest cleaning time may be determined to be 6 days later. In some embodiments, the label may also be manually marked based on experience.

During the training process, the smart gas equipment management platform may construct a loss function from the labels and the output of the initial cleanliness prediction model, and iteratively update the parameters of the cleanliness prediction model through gradient descent or other methods based on the loss function. The model training is completed when the preset condition is met, and the trained cleanliness prediction model is obtained. The preset condition may be that the loss function converges, the number of iterations reaches a threshold, etc.

Determining the latest cleaning time for the gas pipeline based on the cleanliness prediction model may improve the accuracy of determining the latest cleaning time.

By using the latest cleaning time as the area feature of the area to be cleaned, the actual usage needs of the gas pipeline may be fully considered to avoid the situation of fault caused due to untimely cleaning.

In some embodiments of this present disclosure, based on the operation feature and inspection data of at least one gas pipeline, the area to be cleaned and the area feature of the area to be cleaned may be accurately determined based on the actual use of the gas pipeline, which may provide reliable support for the subsequent determination of the pipeline cleaning solution, thereby improving the pipeline cleaning effect.

FIG. 4 is an exemplary flowchart illustrating the determining the pipeline cleaning solution according to some embodiments of this present disclosure. As shown in FIG. 4, the process 400 includes the following steps. In some embodiments, the process 400 may be performed by the smart gas equipment management platform.

Step 410, determining at least one joint area and joint area feature of each of the at least one joint area through merging one or more gas pipelines contained in the area to be cleaned based on a preset method.

The preset method may include selecting multiple preset centers from one or more gas pipelines included in the area to be cleaned and merging the other gas pipelines in the area to be cleaned into the corresponding preset centers based on the feature vectors of all gas pipelines in the area to be cleaned by calculating the similarity of the feature vectors of the other gas pipelines in the area to be cleaned (which may also be referred to as the pipelines to be merged) and the feature vectors of the multiple preset centers or other feasible means. The pipelines to be merged may refer to other gas pipelines other than the preset centers included in the area to be cleaned. For detailed information about the preset method, please refer to the following contents.

The preset centers may refer to one or more gas pipelines in the area to be cleaned selected based on the selection rule. For example, the area to be cleaned includes gas pipelines A, B, C, D and E, the gas pipeline A and the gas pipeline C meet the selection rule, then the gas pipeline A and the gas pipeline C are the preset centers. For detailed information about the selection rule, please refer to the description later.

The feature vector may refer to a vector constructed based on the feature of the gas pipeline in the area to be cleaned. The feature of the gas pipeline may include a variety of contents, such as the distance between the gas pipeline and the preset center, the connection method between the gas pipeline and the preset center, pipeline features (e.g., pipeline internal diameter, rated transmission pressure, pipeline orientation, etc.), cleanliness, etc. The feature vector of the gas pipeline may be expressed as a vector $n=(i, j, k, \ldots)$, each element of which may represent one gas pipeline feature. Exemplarily, the feature vector of a certain gas pipeline is n=(10 meters, direct connection, 30 millimeters, east-west direction, 75), indicating that the distance between the gas pipeline and the preset center is 10 meters, the gas pipeline is directly connected to the preset center, inner diameter of the gas pipeline is 30 millimeters, the gas pipeline is in an east-west direction, and a cleanliness of the gas pipeline is 75.

The distance from the gas pipeline to a preset center in the feature of a gas pipeline may refer to the shortest distance along the line pipe from that gas pipeline to the preset center.

The line pipe may refer to the pipeline route of the gas pipeline. The shortest distance from the gas pipeline to the preset center may refer to the shortest length of the line pipe to reach the preset center.

In some embodiments, the smart gas equipment management platform may determine the shortest distance from the gas pipeline to the preset center through various feasible algorithms. For example, the shortest distance may be calculated by the exhaustive, Dijkstra algorithm.

The distance between the pipeline to be merged and the preset center is used as the feature vector of the gas pipeline for the merging of the pipeline to be merged with the preset center, which facilitates the unified cleaning of gas pipelines with close distances, saves resources and improves cleaning efficiency.

In some embodiments, the feature vectors of the gas pipeline also include the latest cleaning time.

The gas pipelines in the area to be cleaned is merged based on the latest cleaning time, which may be targeted to suspend business in batches and perform unified cleaning.

The smart gas equipment management platform may determine the selection rule in a variety of ways and then select the preset centers. In some embodiments, the smart gas equipment management platform may randomly select a preset center based on the number of gas pipelines in the area to be cleaned. The greater the number of gas pipelines in the area to be cleaned is, the greater the number of selected preset centers is.

In some embodiments, the smart gas equipment management platform may calculate feature vectors of all gas pipelines in the area to be cleaned, and select at least one group of gas pipelines with similarity of feature vector less than a first threshold as a preset center. In some embodiments, the similarity of feature vector between all gas pipelines in the area to be cleaned may be determined based on the vector distance between all gas pipelines in the area to be cleaned. The larger the vector distance is, the smaller similarity of the feature vector is. The vector distance may be expressed based on cosine distance, Euclidean distance, or Hamming distance, etc.

Exemplarily, if the first threshold of similarity of feature vector is 30%, for the plurality of gas pipelines in the area to be cleaned, the similarity of feature vector between gas pipeline A and gas pipeline C is 25%, then gas pipeline A and gas pipeline C may be selected as predetermined centers. The first threshold may be preset manually.

In some embodiments, the smart gas equipment management platform may determine at least one group of gas pipelines whose similarity of feature vector is less than a first threshold in various feasible ways, for example, exhaustion. As another example, K gas pipelines may be randomly selected as preset centers, and the similarity of feature vector between the K gas pipelines is calculated. If the similarity of feature vector meets the first threshold requirement, the K gas pipelines are selected as preset centers. If the similarity of feature vector does not meet the first threshold requirement, the above operations are repeated by randomly re-selecting K gas pipelines. If all random results do not meet the requirement, the S (S<K) gas pipelines may be randomly selected as preset centers and the above operations are repeated until the gas pipelines that meet the first threshold requirement are determined.

In some embodiments, the smart gas equipment management platform may merge other gas pipelines in the area to be cleaned into the corresponding preset centers based on the feature vectors of the gas pipelines in the area to be cleaned. For example, the similarity of feature vector between other gas pipelines in the area to be cleaned and the plurality of preset centers may be calculated, and the other gas pipelines with similarity of the feature vector greater than a second threshold are merged to the corresponding preset centers. The second threshold of the similarity of the feature vector may be manually preset or determined based on merging of historical gas pipelines.

In some embodiments, the similarity of feature vector between the other gas pipelines in the area to be cleaned and the multiple preset centers may be determined based on the vector distance between the feature vectors of the other gas pipelines in the area to be cleaned and the feature vectors of the multiple preset centers. The smaller the vector distance is, the greater the similarity of feature vector is. The vector distance may be expressed based on cosine distance, Euclidean distance, or Hamming distance, etc. As another example, it may preset the corresponding relationship between other gas pipelines and preset centers, and other gas pipelines and preset centers may be merged based on the corresponding relationship.

In some embodiments, different elements of the feature vectors of gas pipelines have different weights when the other gas pipelines in the area to be cleaned are merged into the corresponding preset centers based on the feature vectors of the gas pipelines in the area to be cleaned. The higher the weight of an element is, the greater the effect of that element on the calculation of the similarity of feature vector is, which may further greatly affect the merging of other gas pipelines in the area to be cleaned and the preset center.

Preferably, the elements in the distance-based feature vector have higher weights. For example, higher weights may be given to the distance between the gas pipeline to the preset center and the connection way between the gas pipeline and the preset center in the feature vectors. Exemplarily, the area to be cleaned includes preset center A and preset center B, and the merging method is determined by calculating the similarity of the feature vectors of the gas pipeline C with preset center A and preset center B. When each element in the feature vectors has the same weight, it may be calculated that the similarity of the feature vectors of gas pipeline C and preset center A is greater than the similarity of the feature vectors of gas pipeline C and preset center B, so the gas pipeline C is merged with preset center A. When the distance between the gas pipeline and the preset center and the connection way between the gas pipeline and the preset center are set with higher weights, it may be calculated that the similarity of the feature vectors of the gas pipeline C and the preset center B is greater than the similarity of the feature vectors of the gas pipeline C and the preset center A, so the gas pipeline C is merged with the preset center B. Compared with the former merging method, the gas pipeline C is closer to the preset center B, or the gas pipeline C is directly connected to the preset center B.

Setting higher weights to the elements in the distance-based feature vectors may give priority to merging gas pipelines that are close or directly connected to each other, facilitating the implementation of subsequent pipeline cleaning operations.

In some embodiments, other elements of the feature vectors may also be set with higher weights according to practical needs. For example, if different pipeline cleaning solutions are to be formulated for gas pipelines with different cleanliness, the cleanliness in the feature vectors may be set with higher weight to give priority to merge the gas pipelines with close cleanliness.

The joint area is the area formed by the merged gas pipelines. The joint area includes at least one gas pipeline to be cleaned.

The joint area feature is the pipeline related feature of the joint area. For example, the joint area feature may include the cleanliness of the gas pipeline in the joint area, the pipeline feature in the joint area (e.g., pipeline internal diameter, rated transmission pressure, etc.), etc.

In some embodiments, the smart gas equipment management platform may determine at least one joint area based on the merged gas pipelines. For example, the area to be cleaned where the merged gas pipelines are located may be merged as a joint area. As another example, for multiple areas to be cleaned where the merged gas pipelines are located, the multiple areas to be cleaned and the areas connecting the multiple areas to be cleaned may also be merged as a joint area.

In some embodiments, the smart gas equipment management platform may determine the joint area feature of each joint area of the at least one joint area based on the merged gas pipelines. For example, the average of the cleanliness of all gas pipelines in a joint area, and the average of the pipeline features of all gas pipelines in the joint area (e.g., the average of pipeline internal diameters, the average of rated transmission pressures, etc.) may be used as joint area feature. As another example, the mode of cleanliness of gas pipelines in a joint area and the mode of pipeline feature in a joint area may also be used as joint area features.

Step 420, determining a target pipeline cleaning solution of the joint area based on the joint area feature of the joint area.

The target pipeline cleaning solution is the solution used to clean the gas pipelines in the joint area. The target pipeline cleaning solution may include the selection of pipeline cleaning equipment (e.g., pipeline cleaning balls, bowl cleaners, etc.), the adjustment of equipment parameters (e.g., size, type, overfilling, etc., of the pipeline cleaning equipment), the moment (or time period) for executing the pipeline cleaning solution, and the adjustment of the pipeline gas transmission pressure. Exemplarily, the target pipeline cleaning solution may be to clean the joint area from 20:00 to 22:00 tonight using a cleaner with 25 millimeters of overfilling.

The smart gas equipment management platform may determine the target pipeline cleaning solution of the joint area in various ways based on the joint area feature of the joint area. For example, the smart gas equipment management platform may calculate the vector similarity between the joint area feature and the feature of other gas pipelines, determine the same type of pipelines in the joint area, and use the historical pipeline cleaning solution of the same type of pipelines in the joint area as the target pipeline cleaning solution of the joint area.

In some embodiments, the smart gas equipment management platform may also determine a plurality of candidate pipeline cleaning solutions based on the joint area feature of the joint area, and determine a target pipeline cleaning solution based on the pipeline cleaning effect of the plurality of candidate pipeline cleaning solutions. For detailed information about the determination of the target pipeline cleaning solution based on the candidate pipeline cleaning solutions, please refer to FIG. 5 and its related contents.

In some embodiments of this present disclosure, one or more gas pipelines included in the area to be cleaned are merged, and the target pipeline cleaning solution is determined based on the merged joint area and the joint area feature, so that a suitable target pipeline cleaning solution may be determined according to different joint areas, facilitating unified cleaning and saving resources and time.

Figure 5:
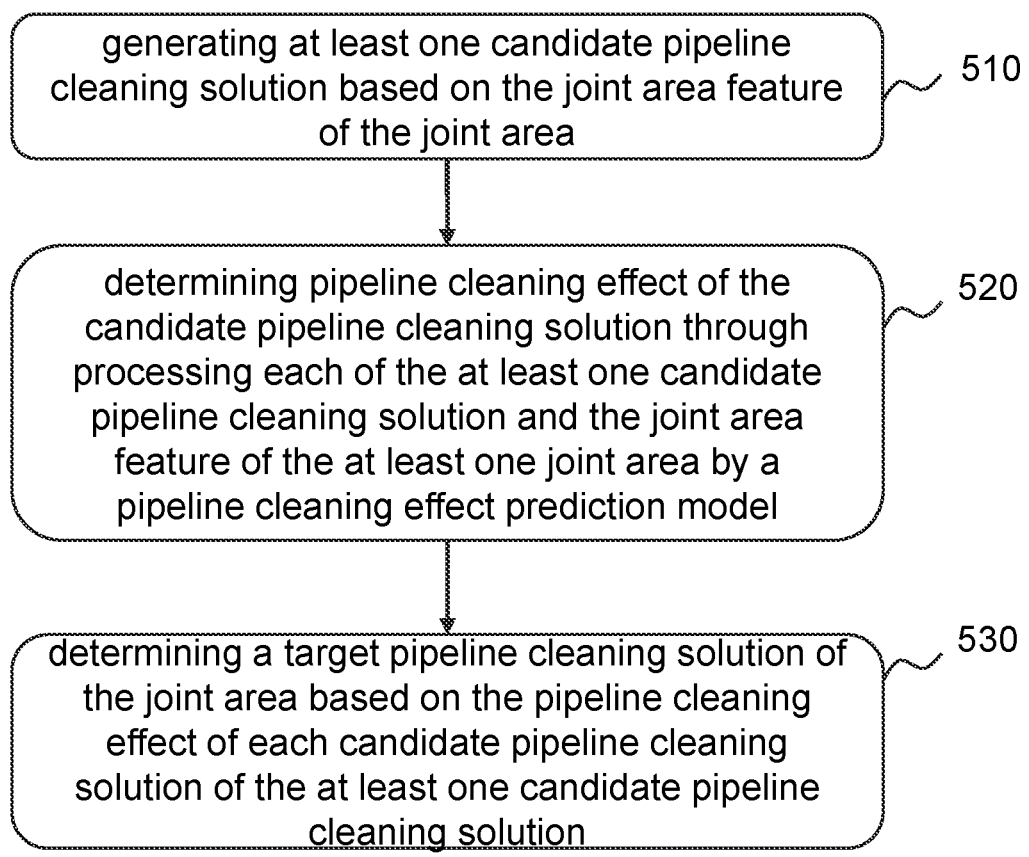
FIG. 5 is an exemplary flowchart illustrating the determining a target pipeline cleaning solution of a joint area according to some embodiments of this present disclosure.

FIG. 5 is an exemplary flowchart illustrating the determining a target pipeline cleaning solution of a joint area according to some embodiments of this present disclosure. As shown in FIG. 5, the process 500 includes the following steps. In some embodiments, the process 500 may be performed by a smart gas equipment management platform.

Step 510, generating at least one candidate pipeline cleaning solution based on the joint area feature of the joint area.

The candidate pipeline cleaning solution is the solution that may be used to clean the gas pipeline in the joint area. The candidate pipeline cleaning solution may include the selection of pipeline cleaning equipment, adjustment of equipment parameters, etc. For more information about the candidate pipeline cleaning solution, please refer to the relevant content of the target pipeline cleaning solution.

In some embodiments, the smart gas equipment management platform may generate at least one candidate pipeline cleaning solution based on the joint area feature of the joint area in a variety of ways. For example, the vector similarity between the joint area feature and the features of other gas pipelines may be calculated to determine the same type of pipelines in that joint area, and the historical pipeline cleaning solutions of the same type of pipelines in the joint area may be used as candidate pipeline cleaning solution of the joint area. Specifically, the gas pipeline that meets a vector similarity threshold or has the highest vector similarity may be determined as the same type of pipeline of that joint area, and the vector similarity threshold may be manually preset. For the calculation of the vector similarity, please refer to FIG. 4 for the related contents. As another example, it may preset different candidate pipeline cleaning solution corresponding to different joint area features based on the joint area feature of the joint area.

Step 520, determining pipeline cleaning effect of the candidate pipeline cleaning solution through processing each of the at least one candidate pipeline cleaning solution and the joint area feature of the joint area by a pipeline cleaning effect prediction model.

The pipeline cleaning effect prediction model may be used to determine the pipeline cleaning effect of the candidate pipeline cleaning solution. The pipeline cleaning effect prediction model may be a trained machine learning model, for example, the pipeline cleaning effect prediction model may include any one or a combination of various feasible models such as a recurrent neural network model, a deep neural network model, a convolutional neural network model, etc.

The input of the pipeline cleaning effect prediction model may include each candidate pipeline cleaning solution of at least one candidate pipeline cleaning solution and the joint area feature of joint area. The output of the pipeline cleaning effect prediction model may include the pipeline cleaning effect of each of the at least one candidate pipeline cleaning solution. For the illustration of the pipeline cleaning effect, please refer to the relevant part of FIG. 2.

In some embodiments, the input of the pipeline cleaning effect prediction model further includes a historical cleanliness sequence of gas pipelines contained in the joint area.

The historical cleanliness sequence may refer to a sequence consisting of cleanliness of gas pipelines in the joint area corresponding to multiple historical time points. The historical cleanliness sequence may be expressed as $X=(x1, x2, x3, \ldots, xn)$, each element of which may represent the cleanliness corresponding to a historical time point.

In some embodiments, the historical cleanliness sequence may be determined based on a cleanliness determination model. For example, the historical cleanliness of all gas pipelines in the joint area at multiple historical time points output by the cleanliness determination model may be used as the historical cleanliness of the joint area at multiple historical time points, and then a historical cleanliness sequence may be constructed. Exemplarily, the joint area includes three gas pipelines, and three historical cleanliness of the three gas pipelines at each of multiple historical time points output by the cleanliness determination model are as (60, 75, 80), (60, 65, 70), (55, 60, 70), and (84, 89, 95), respectively, then (60, 75, 80), (60, 65, 70), (84, 89, 95), (55, 60, 70), and (84, 89, 95) may represent the historical cleanliness of the joint area at each historical time point, and thus the historical cleanliness sequence of gas pipelines contained in the joint area may be represented as ((60, 75, 80), (60, 65, 70), (55, 60, 70), (84, 89, 95)).

In some embodiments, the average of the historical cleanliness of all gas pipelines in the joint area at multiple historical time points may also be calculated as the historical cleanliness of the joint area at multiple historical time points, thereby constructing a historical cleanliness sequence. For example, the average of the historical cleanliness of all gas pipelines in the joint area at each historical time point in multiple historical time points are 60, 70 and 80, respectively, then 60, 70 and 80 represent the historical cleanliness of the joint area at each historical time point, respectively, and thus the historical cleanliness sequence of gas pipelines contained in the joint area may be expressed as (60, 70, 80).

In some embodiments, the historical cleanliness of a preset center of a joint area at multiple historical time points may also be used as the historical cleanliness of the joint area at multiple historical time points, thereby constructing a historical cleanliness sequence. For example, the historical cleanliness of the preset center of the joint area at each of the multiple historical time points are 77, 80, 86, and 90, respectively, then 77, 80, 86, and 90 may represent the historical cleanliness of the joint area at each historical time point, and thus the historical cleanliness sequence of the gas pipeline contained in the joint area may be represented as (77, 80, 86, 90).

Training the pipeline cleaning effect prediction model based on the historical cleanliness sequence of gas pipelines may fully take into account the trend of cleanliness changes over time and more accurately predict the pipeline cleaning effect of the implementation of the candidate pipeline cleaning solution.

In some embodiments, the pipeline cleaning effect prediction model may be obtained by model training. The smart gas equipment management platform may train the pipeline cleaning effect prediction model based on a third training sample with labels. Specifically, the third training sample with labels may be input to the pipeline cleaning effect prediction model, and the parameters of the pipeline cleaning effect prediction model may be updated by training. The third training sample may include sample candidate pipeline cleaning solutions, joint area feature of the sample joint areas, and historical cleanliness sequences of gas pipelines contained in the sample joint areas. The labels of the third training sample are the pipeline cleaning effect corresponding to the sample candidate pipeline cleaning solution. In some embodiments, the third training sample and labels may be obtained based on historical data. During the training process, the smart gas equipment management platform may train the cleanliness determination model in various feasible ways. For example, the training may be performed based on the gradient descent method. For detailed information about the pipeline cleaning effect prediction model, please refer to the relevant contents of FIG. 6.

The pipeline cleaning effect of the candidate pipeline cleaning solution may be predicted through the pipeline cleaning effect prediction model, which may fully consider the effect of joint area feature on the pipeline cleaning effect, improve the prediction effect, reduce the cost of manual prediction and help to select the optimal pipeline cleaning solution.

Step 530, determining a target pipeline cleaning solution of the joint area based on the pipeline cleaning effect of each candidate pipeline cleaning solution of the at least one candidate pipeline cleaning solution.

In some embodiments, the smart gas equipment management platform may determine a target pipeline cleaning solution of the joint area in a variety of ways based on the pipeline cleaning effect of each candidate pipeline cleaning solution of at least one candidate pipeline cleaning solution. For example, the candidate pipeline cleaning solution with the best pipeline cleaning effect may be determined as the target pipeline cleaning solution. As another example, each candidate pipeline cleaning solution may be sorted from high to low of pipeline cleaning effect, and the user may select the candidate pipeline cleaning solution as the target pipeline cleaning solution through the terminal.

In some embodiments of this disclosure, a candidate pipeline cleaning solution may be determined based on the joint area feature and a target pipeline cleaning solution may be determined based on the pipeline cleaning effect of the candidate pipeline cleaning solution, which may determine a suitable candidate pipeline cleaning solution in a more reasonable manner, and fully consider the effect of the joint area feature on the pipeline cleaning effect, thus providing an optimal pipeline cleaning solution.

Figure 6:
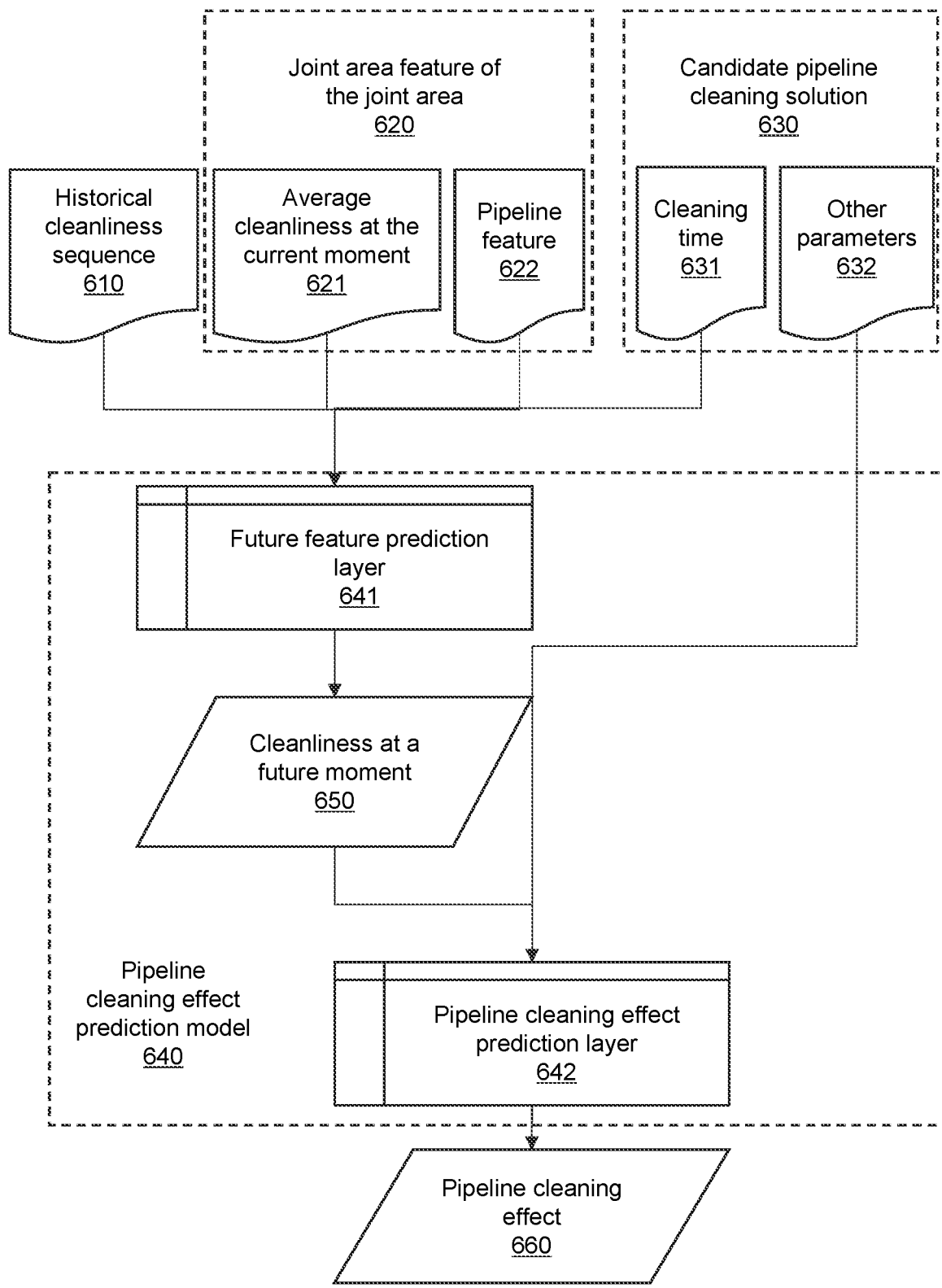
FIG. 6 is an exemplary schematic diagram illustrating a pipeline cleaning effect prediction model according to some embodiments of the present disclosure.

FIG. 6 is an exemplary schematic diagram illustrating a pipeline cleaning effect prediction model according to some embodiments of the present disclosure.

As shown in FIG. 6, in some embodiments, the pipeline cleaning effect prediction model 640 includes a future feature prediction layer 641 and a pipeline cleaning effect prediction layer 642. The pipeline cleaning effect prediction model 640 may determine the pipeline cleaning effect 660 based on the processing of the joint area feature of the joint area 620 and the candidate pipeline cleaning solution 630. In some embodiments, the joint area feature of the joint area 620 include an average cleanliness 621 at the current moment and pipeline feature 622. The candidate pipeline cleaning solution 630 may include a cleaning time 631 as well as other parameters 632.

In some embodiments, an input of the future feature prediction layer 641 may include a historical cleanliness sequence 610, a joint area feature of the joint area 620, and the cleaning time 631 in the candidate pipeline cleaning solution 630. In some embodiments, an output of the future feature prediction layer 641 may include a cleanliness 650 at a future moment. For more information about the historical cleanliness sequence and candidate pipeline cleaning solution, please refer to FIG. 5 and its related description. For more information about the joint area feature of the joint area, please refer to FIG. 4 and its related description. For more information about the cleaning time, please refer to the description of the cleaning time of the pipeline cleaning solution in the description of FIG. 2.

The average cleanliness at the current moment is the average cleanliness of the gas pipeline in the joint area when predicting pipeline cleaning effect. In some embodiments, the smart gas equipment management platform may determine the average cleanliness at the current moment by performing operations on the difference between certain parameters in the operation feature and/inspection data of gas pipelines in the joint area and standard values or standard ranges. The operations may be averaging, weighted averaging, etc. For example, if there are three gas pipelines in the joint area and the difference between certain parameters in the operation feature and/or inspection data of the three gas pipelines and standard values or standard ranges are calculated as 5%, 5% and 8%, respectively, then the average of the differences is 6%, and the average cleanliness of the joint area at the current moment may be determined according to the aforementioned preset arithmetic rule (e.g., the description of the preset arithmetic rule in the relevant contents of FIG. 2, etc.).

The pipeline features are the actual parameters of the gas pipeline, such as the internal diameter of the pipeline, the rated transmission pressure, and the pipeline orientation (e.g., east-west orientation, south-north orientation, etc.). In some embodiments, the smart gas equipment management platform may obtain pipeline features directly from the smart gas pipeline network equipment object sub-platform.

The cleanliness at the future moment refer to the predicted cleanliness of the gas pipeline for which the candidate pipeline cleaning solution is implemented. For more information about the cleanliness, please refer to FIG. 3 and its related description.

In some embodiments, the input of the pipeline cleaning effect prediction layer 642 may include a cleanliness 650 at the future moment, other parameters 632 in the candidate pipeline cleaning solution 630. The cleanliness 650 at the future moment is the output of the future feature prediction layer 641. In some embodiments, the output of the pipeline cleaning effect prediction layer 642 may include a pipeline cleaning effect 660. For more information about the cleaning effect, please refer to FIG. 2 and its related description.

The other parameters 632 in the candidate pipeline cleaning solution 630 may include the selection of the pipeline cleaning equipment, the parameters of the pipeline cleaning equipment, the operation time of the pipeline cleaning, the adjustment of the pipeline gas transmission pressure, etc. For more information about the other parameters, please refer to FIG. 2 and its related description.

In some embodiments, the future feature prediction layer 641 and the pipeline cleaning effect prediction layer 642 may be obtained by joint training.

In some embodiments, the sample data of the joint training includes the sample historical cleanliness sequence, the joint area feature of the sample joint area, and the sample pipeline cleaning solution. The joint area feature of the sample joint area may include the cleanliness of the sample at the current moment and the sample pipeline feature, and the sample pipeline cleaning solution may include the sample pipeline cleaning time and other parameters of the sample. For information about the contents of the sample other parameters, please refer to the description of the other parameters 632 above. The labels may be the sample pipeline cleaning effect. The training samples and labels may be obtained based on historical data.

During training, the sample historical cleanliness sequence, the sample cleanliness at current moment and the sample pipeline feature in the joint area feature of the sample joint area, and the sample cleaning time in the sample pipeline cleaning solution are input into the initial future feature prediction layer, and the cleanliness at the future moment output from the initial future feature prediction layer is obtained. The cleanliness at the future moment and the sample other parameters in the sample candidate pipeline cleaning solution are input into the initial pipeline cleaning effect prediction layer to obtain the pipeline cleaning effect output from the initial pipeline cleaning effect prediction layer. The loss function is constructed based on the sample pipeline cleaning effect and the pipeline cleaning effect output from the initial pipeline cleaning effect prediction layer, and the parameters of the initial future feature prediction layer and the initial pipeline cleaning effect prediction layer are updated simultaneously to obtain the trained future feature prediction layer 641 and the trained pipeline cleaning effect prediction layer 642 by updating.

In some embodiments of this present disclosure, the trained pipeline cleaning effect prediction model is obtained by training the initial pipeline cleaning effect prediction model with a large amount of extensive data, which may predict the pipeline cleaning effect of the candidate pipeline cleaning solution relatively quickly and accurately, and then determine the candidate pipeline cleaning solution with the best pipeline cleaning effect as the pipeline cleaning solution, so as to ensure the actual effect after implementation of the pipeline cleaning solution and the efficiency and safety of gas pipeline operation.

The basic concepts have been described above, and it is clear that the above detailed disclosure is intended as an example only for those skilled in the art and does not constitute a limitation of this present disclosure. Although not explicitly stated herein, there are various modifications, improvements, and amendments that may be made to this present disclosure by those skilled in the art. This type of modification, improvement, and corrections are recommended in present disclosure, so the type of modification, improvement, and corrections remains in the spirit and scope of the exemplary embodiment of the present disclosure.

At the same time, the present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names, is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only solution, e.g., an installation on an existing server or mobile device.

Similarly, it should be noted that in order to simplify the expression disclosed in the present disclosure and help the understanding of one or more embodiments of the present disclosure, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. A method of smart gas pipeline cleaning management for safety management, implemented based on a smart gas equipment management platform of an Internet of Things system of smart gas pipeline cleaning management for safety management, comprising:

obtaining operation feature of at least one gas pipeline and inspection data of the at least one gas pipeline;

determining an area to be cleaned and an area feature of the area to be cleaned based on the operation feature of the at least one gas pipeline and the inspection data of the at least one gas pipeline;

determining a pipeline cleaning solution based on the area feature of the area to be cleaned; and evaluating a pipeline cleaning effect of the pipeline cleaning solution based on an implementation of the pipeline cleaning solution; wherein the determining a pipeline cleaning solution based on the area feature of the area to be cleaned includes:

determining at least one joint area and a joint area feature of each of the at least one joint area through merging one or more gas pipelines contained in the area to be cleaned based on a preset method; and determining a target pipeline cleaning solution of the at least one joint area based on the joint area feature of the at least one joint area; wherein the determining a target pipeline cleaning solution of the at least one joint area based on the joint area feature of the at least one joint area includes:

generating at least one candidate pipeline cleaning solution based on the joint area feature of the at least one joint area;

determining a pipeline cleaning effect of each of the at least one candidate pipeline cleaning solution through processing each of the at least one candidate pipeline cleaning solution and the joint area feature of the joint area based on a pipeline cleaning effect prediction model; and determining the target pipeline cleaning solution of the at least one joint area based on the pipeline cleaning effect of each of the at least one candidate pipeline cleaning solution; wherein the pipeline cleaning effect prediction model includes a future feature prediction layer and a pipeline cleaning effect prediction layer, the future feature prediction layer and the pipeline cleaning effect prediction layer are obtained by joint training based on training samples and labels, wherein the training samples include a sample historical cleanliness sequence, a joint area feature of a sample joint area, and a sample pipeline cleaning solution, the joint area feature of the sample joint area includes a sample cleanliness at a current moment and a sample pipeline feature, and the sample pipeline cleaning solution includes sample pipeline cleaning time and other sample parameters, and the labels include a sample pipeline cleaning effect, the joint training including:

inputting the sample historical cleanliness sequence, the sample cleanliness at the current moment, and the sample pipeline feature, and the sample pipeline cleaning time into an initial future feature prediction layer and obtaining cleanliness at a future moment output from the initial future feature prediction layer;

inputting the cleanliness at the future moment and the other sample parameters into an initial pipeline cleaning effect prediction layer and obtaining the pipeline cleaning effect output from the initial pipeline cleaning effect prediction layer;

constructing a loss function based on the sample pipeline cleaning effect and the pipeline cleaning effect output from the initial pipeline cleaning effect prediction layer;

updating parameters of the initial future feature prediction layer and the initial pipeline cleaning effect prediction layer simultaneously; and obtaining the future feature prediction layer and the pipeline cleaning effect prediction layer.

2. The method of claim 1, wherein the determining an area to be cleaned and an area feature of the area to be cleaned based on the operation feature of the at least one gas pipeline and the inspection data of the at least one gas pipeline includes:

determining cleanliness of each of the at least one gas pipeline based on the operation feature of the at least one gas pipeline and the inspection data of the at least one gas pipeline;

determining the area to be cleaned based on the gas pipeline whose cleanliness meets a preset cleanliness condition; and determining the area feature of the area to be cleaned based on the cleanliness of the gas pipeline corresponding to the area to be cleaned.

3. The method of claim 1, wherein an input of the pipeline cleaning effect prediction model further includes a historical cleanliness sequence of the gas pipeline contained in the joint area, the historical cleanliness sequence is determined by a cleanliness determination model, and the pipeline cleaning effect prediction model and the cleanliness determination model are machine learning models.

4. The method of claim 1, wherein the Internet of Things system of the smart gas pipeline cleaning management for safety management further comprises a smart gas user platform, a smart gas service platform, a smart gas sensing network platform, and a smart gas object platform;
the operation feature and the inspection data of the at least one gas pipeline are obtained based on the smart gas object platform; and transmitted to the smart gas equipment management platform based on the smart gas sensing network platform;
the method further comprises:
transmitting the pipeline cleaning solution and the pipeline cleaning effect to the smart gas user platform based on the smart gas service platform.

5. The method of claim 4, wherein the smart gas user platform includes a gas user sub-platform, a government user sub-platform, and a supervision user sub-platform;
the smart gas service platform includes a smart gas service sub-platform, a smart operation service sub-platform, and a smart supervision service sub-platform;
the smart gas equipment management platform includes a smart gas indoor equipment management sub-platform, a smart gas pipeline network equipment management sub-platform, and a smart gas data center, wherein the smart gas pipeline network equipment management sub-platform includes an equipment ledger management module, an equipment maintenance record management module, and an equipment status management module;
the smart gas sensing network platform includes a smart gas indoor equipment sensing network sub-platform, and a smart gas pipeline network equipment sensing network sub-platform; and
the smart gas object platform includes a smart gas indoor equipment object sub-platform and a smart gas pipeline network equipment object sub-platform.

6. A non-transitory computer readable storage medium, wherein the storage medium stores computer instructions, when the computer instructions are executed by a processor, a method of smart gas pipeline cleaning management for safety management of claim 1 is implemented.

7. An Internet of Things system of smart gas pipeline cleaning management for safety management, comprising: a smart gas user platform, a smart gas service platform, a smart gas equipment management platform, a smart gas sensing network platform, and a smart gas object platform, wherein
the smart gas object platform is used to obtain operation feature of at least one gas pipeline and inspection data of the at least one gas pipeline;
the smart gas sensing network platform is used to transmit the operation feature of the at least one gas pipeline and the inspection data of the at least one gas pipeline to the smart gas equipment management platform;
the smart gas equipment management platform is used to:
determine an area to be cleaned and an area feature of the area to be cleaned based on the operation feature of the at least one gas pipeline and the inspection data of the at least one gas pipeline;
determine a pipeline cleaning solution based on the area feature of the area to be cleaned; and
evaluate a pipeline cleaning effect of the pipeline cleaning solution based on an implementation of the pipeline cleaning solution; wherein to determine a pipeline cleaning solution based on the area feature of the area to be cleaned, the smart gas equipment management platform is further used to:
determine at least one joint area and a joint area feature of each of the at least one joint area through merging one or more gas pipelines contained in the area to be cleaned based on a preset method; and
determine a target pipeline cleaning solution of the at least one joint area based on the joint area feature of the at least one joint area; wherein to determine a target pipeline cleaning solution of the at least one joint area based on the joint area feature of the at least one joint area, the smart gas equipment management platform is further used to:
generate at least one candidate pipeline cleaning solution based on the joint area feature of the at least one joint area;
determine a pipeline cleaning effect of each of the at least one candidate pipeline cleaning solution through processing each of the at least one candidate pipeline cleaning solution and the joint area feature of the joint area based on a pipeline cleaning effect prediction model; and
determine the target pipeline cleaning solution of the at least one joint area based on the pipeline cleaning effect of each of the at least one candidate pipeline cleaning solution; wherein
the pipeline cleaning effect prediction model includes a future feature prediction layer and a pipeline cleaning effect prediction layer, the future feature prediction layer and the pipeline cleaning effect prediction layer are obtained by joint training based on training samples and labels, wherein the training samples include a sample historical cleanliness sequence, a joint area feature of a sample joint area, and a sample pipeline cleaning solution, the joint area feature of the sample joint area includes a sample cleanliness at a current moment and a sample pipeline feature, and the sample pipeline cleaning solution includes sample pipeline cleaning time and other sample parameters, and the labels include a sample pipeline cleaning effect, the joint training including:
inputting the sample historical cleanliness sequence, the sample cleanliness at the current moment, and the sample pipeline feature, and the sample pipeline cleaning time into an initial future feature prediction layer and obtaining cleanliness at a future moment output from the initial future feature prediction layer;
inputting the cleanliness at the future moment and the other sample parameters into an initial pipeline cleaning effect prediction layer and obtaining the pipeline cleaning effect output from the initial pipeline cleaning effect prediction layer;
constructing a loss function based on the sample pipeline cleaning effect and the pipeline cleaning effect output from the initial pipeline cleaning effect prediction layer;
updating parameters of the initial future feature prediction layer and the initial pipeline cleaning effect prediction layer simultaneously; and
obtaining the future feature prediction layer and the pipeline cleaning effect prediction layer;
the smart gas service platform is used to transmit the pipeline cleaning solution and the pipeline cleaning effect of the pipeline cleaning solution to the smart gas user platform.

8. The system of claim 7, wherein the smart gas equipment management platform is further used to:
   determine cleanliness of each of the at least one gas pipeline based on the operation feature of the at least one gas pipeline and the inspection data of the at least one gas pipeline;
   determine the area to be cleaned based on the gas pipeline whose cleanliness meets a preset cleanliness condition; and
   determine the area feature of the area to be cleaned based on the cleanliness of the gas pipeline corresponding to the area to be cleaned.

* * * * *